United States Patent [19]

Alexander

[11] Patent Number: 5,060,585
[45] Date of Patent: Oct. 29, 1991

[54] AGRICULTURAL SEED PLANTER

[76] Inventor: Frederick M. Alexander, Private Bag 2502, Banket, Zimbabwe

[21] Appl. No.: 629,042

[22] Filed: Dec. 14, 1990

Related U.S. Application Data

[63] Continuation of Ser. No. 439,785, Nov. 21, 1989, abandoned.

[30] Foreign Application Priority Data

Nov. 22, 1988 [RH] Zimbabwe .............................. 155/88

[51] Int. Cl.⁵ .............................................. A01C 5/04
[52] U.S. Cl. ..................... 111/89; 111/134; 111/157; 111/194
[58] Field of Search ................... 111/52–54, 111/60, 62, 59–78, 79–81, 83, 102, 110–113, 121, 122, 125, 89–91, 130–136, 138–140, 153, 99, 157–159, 161, 162, 191, 194–196; 172/547, 551

[56] References Cited

U.S. PATENT DOCUMENTS

| | | | |
|---|---|---|---|
| 325,512 | 9/1885 | Elam | 111/139 X |
| 803,503 | 10/1905 | Monson | 111/153 X |
| 947,216 | 1/1910 | Philippi | 111/153 X |
| 1,105,570 | 7/1914 | Lea | 111/157 |
| 2,022,335 | 11/1935 | Bernthal | 172/547 |
| 2,506,430 | 5/1950 | Melvin | 111/110 X |
| 2,885,978 | 5/1959 | Miller | 111/156 X |
| 3,134,346 | 5/1964 | Menn | 111/153 X |
| 3,170,421 | 2/1965 | Norris | 111/156 X |
| 3,397,748 | 8/1968 | Whitesides | 111/132 X |
| 3,815,528 | 6/1974 | Hawkins . | |
| 4,102,406 | 7/1978 | Orthman | 172/551 X |
| 4,217,835 | 8/1980 | Fox | 111/162 X |
| 4,258,635 | 3/1981 | Lutz | 111/162 X |
| 4,428,437 | 1/1984 | Stemberg | 172/547 |
| 4,785,890 | 11/1988 | Martin | 111/52 X |
| 4,817,732 | 4/1989 | Brown | 172/548 |

FOREIGN PATENT DOCUMENTS

| | | | |
|---|---|---|---|
| 10149 | 7/1971 | Australia . | |
| 511369 | 5/1952 | Belgium . | |
| 201785 | 11/1986 | European Pat. Off. | 111/162 |
| 2728295 | 1/1979 | Fed. Rep. of Germany | 111/161 |
| 1356084 | 2/1964 | France . | |
| 28/84 | 11/1990 | Zimbabwe . | |
| 129883 | 1/1960 | U.S.S.R. | 111/140 |
| 927137 | 5/1982 | U.S.S.R. | 111/162 |
| 1412623 | 7/1988 | U.S.S.R. | 111/157 |
| 769 | 3/1868 | United Kingdom | 111/158 |
| 2075811 | 11/1981 | United Kingdom . | |
| 2176982 | 1/1987 | United Kingdom | 111/162 |

Primary Examiner—Danton D. DeMille
Attorney, Agent, or Firm—Davis, Bujold & Streck

[57] ABSTRACT

An agricultural seed planter comprising a frame adapted to be mounted to any conventionally drawn tool bar; a shaft attached to the frame and angled relative to the direction of travel and having mounted thereupon a soil cutting wheel designed as a multi-tined spider; sweepers attached to the frame and positioned to the side and parallel to the plane of rotation of the soil cutting wheel; a vertically adjustable ski shaped surface contacting member adjacent to the soil cutting wheel adapted so as to regulate the depth of soil cut; a seed dispensing apparatus positioned to deposit seed generally behind the soil cutting wheel and a suitable seed covering device, the sweepers comprise rigid formations attached at their forward facing ends to the frame of the planter and extend rearwards, on either side of an in close proximity to the multi-tined spider wheels such that, when in motion, any accumulated debris is swept from the tines of the spider. The seed dispensing apparatus being a chute having flexibly deformable skirts located to be in soil contact.

16 Claims, 3 Drawing Sheets

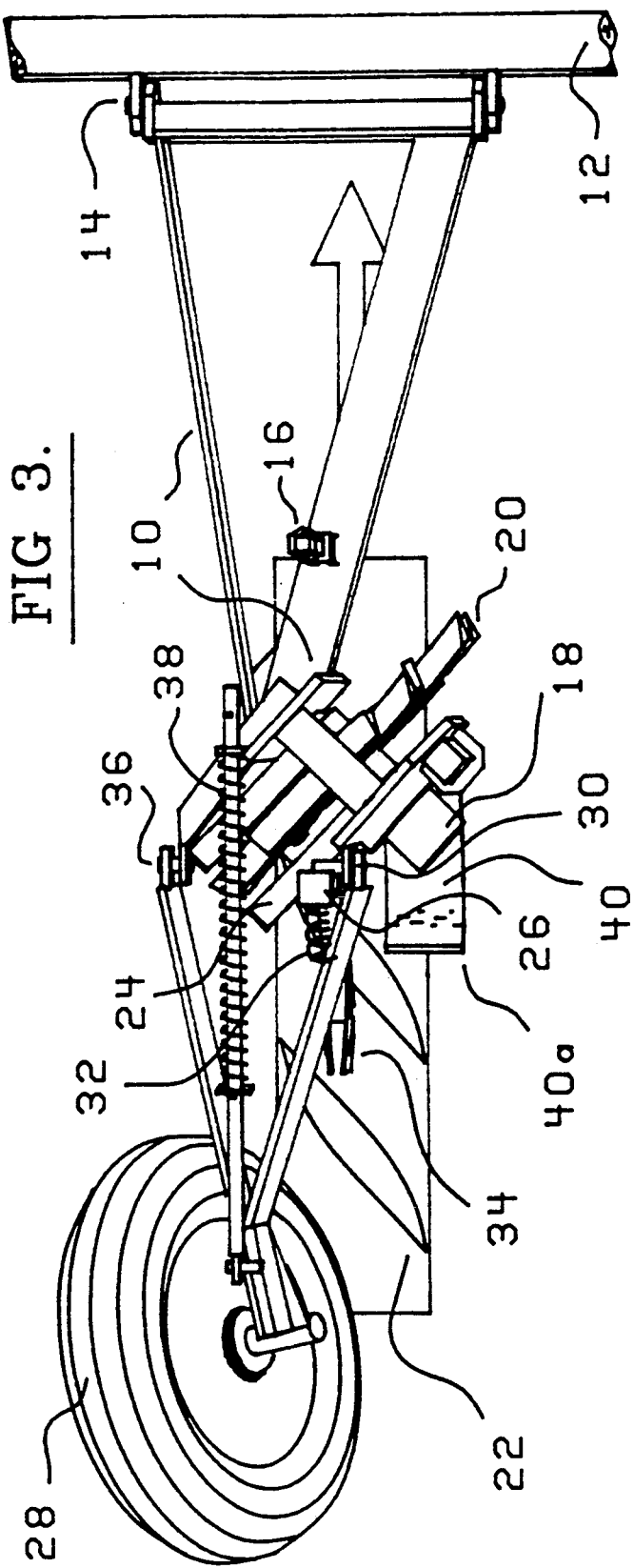

AGRICULTURAL SEED PLANTER

This is a continuation of copending application Ser. No. 07/439,785 filed on Nov. 21, 1989 now abandoned.

This invention is concerned with agricultural seed planters and more particularly with a planter developed for use with the so called "conservation tillage" technique of farming.

Planters have historically suffered from several problems. Certain seeds are difficult to germinate unless shallow planted which requires great accuracy of seed placement. A number of years ago, a so-called "hill-dropper" system was developed to address this problem, which instead of dispensing a continuous stream of seed, placed several seeds in clusters at intervals. It is accepted that groups of seedlings pushing together are more successful in penetrating a surface crust. Because the clusters of seed tended to become smeared at speed, and further because mechanical complexity reduced reliability and forced up cost of maintenance, many people abandoned this system.

In recent years, attempts have been made to eliminate tillage to combat the ever rising cost of mechanical operations. Planting into a mulch of previous crop residues has now become a practical proposition using recently developed selective herbicides to control the inevitable unwanted re-growth. This method is commonly referred to as "Zero Till" or "Conservation Tillage". When rainfall adds mud to trash however, the fixed tines or shoes on conventional planters clog up completely. Even disc coulters on seed drills stop turning in very soft conditions, the trash then accumulates rapidly as the mud scrapers cease to operate.

It will be readily apreciated that conventional planters are not well adapted to cope with the new technique of planting into crop residues and there have been attempts to address this problem in several ways. U.S. Pat. No. 4,817,732 of Douglas P. Brown and Donald R. Peck provides a spider wheel similar to that used in this invention, but which is specifically intended to address the requirement to incorporate small seed and/or chemicals into soil which has already been tilled.

More notably, in the U.S. Pat. No. 4,785,890 of Howard D. Martin, an attachment comprising spider wheels is proposed which clears trash aside to allow a conventional planter a reasonably clear path across the ground which will of course reduce the aforementioned tendency to clog.

Other attempts include the heavy duty multi coulter type seed drill, and both the furrow openers and fluted coulter attachments fitted ahead of conventional planter units with the intention of moving trash aside, have enjoyed limited success. These machines have tended to be expensive and/or complex and have generally failed to work in either moist or hard conditions, or whenever considerable surface trash is also present.

It is the inventors view that all of these machines have been addressing only half of the problem and that what is required is a new purpose designed and built conservation planter which will not only cope with the problem addressed above, namely planting into trash, but will also provide a planter capable of effectively penetrating the hard untilled surface whilst at the same time, accurately placing seed beneath a layer of trash.

Furthermore, the inventor has simultaneously addressed the speed of operation on conservation tillage, including planting. Conventional seed planters tend to lose callibration and are prone to blockages and breakages if planting speeds are increased. The planter of the invention has been purpose designed to operate efficiently at speeds significantly higher than those now generally accepted.

The invention makes use of one or more spider wheels or rotary tines the same as, or similar to, those employed by a well known rotary cultivator commonly known as a "Gang Tiller".

It has been found that the planter unit avoids blockages in extreme conditions because spider rotation is ensured by positive engagement of the rotary tines with the soil. This effects a self cleaning action between the tines and fixed sweepers mounted beside the spiders. A steady regulated stream of seed falling into depressions, which take the form of shallow diagonal slots formed by the spiders, produces a "hill drop" effect. Those seeds not falling to the bottom of the slots will lie at varying depths, ensuring that some seeds lie at optimum germination depth, whatever subsequent soil surface conditions result.

Therefor, according to the invention, a seed planter comprising in working combination, a frame including means to mount the frame to any conventional drawn tool bar; attached to said frame and suitably angled relative to the direction of travel, a shaft having mounted thereupon one or more soil cutting devices; in association with said soil cutting devices, one or more sweepers attached to the frame and positioned to the side and parallel to the plane of rotation of the soil cutting devices; attached to the frame, a vertically adjustable surface contacting member adjacent to the soil cutting devices adapted so as to regulate depth of soil cut; and seed dispensing apparatus so positioned as to deposit seed generally behind the soil cutting devices and in association with suitable seed covering means.

In order to facilitate the further understanding of the invention, one preferred example will now be described in detail with reference to the accompanying schematic drawings, in which:

FIG. 3 is a view of the planter generally from above.

In the ensuring description, which is in respect of one presently preferred embodiment of the invention, the description should not be interpreted in a manner likely to limit the inventive concept. Like reference numerals will be used to refer to the same parts in each of the drawings.

Figure 1:
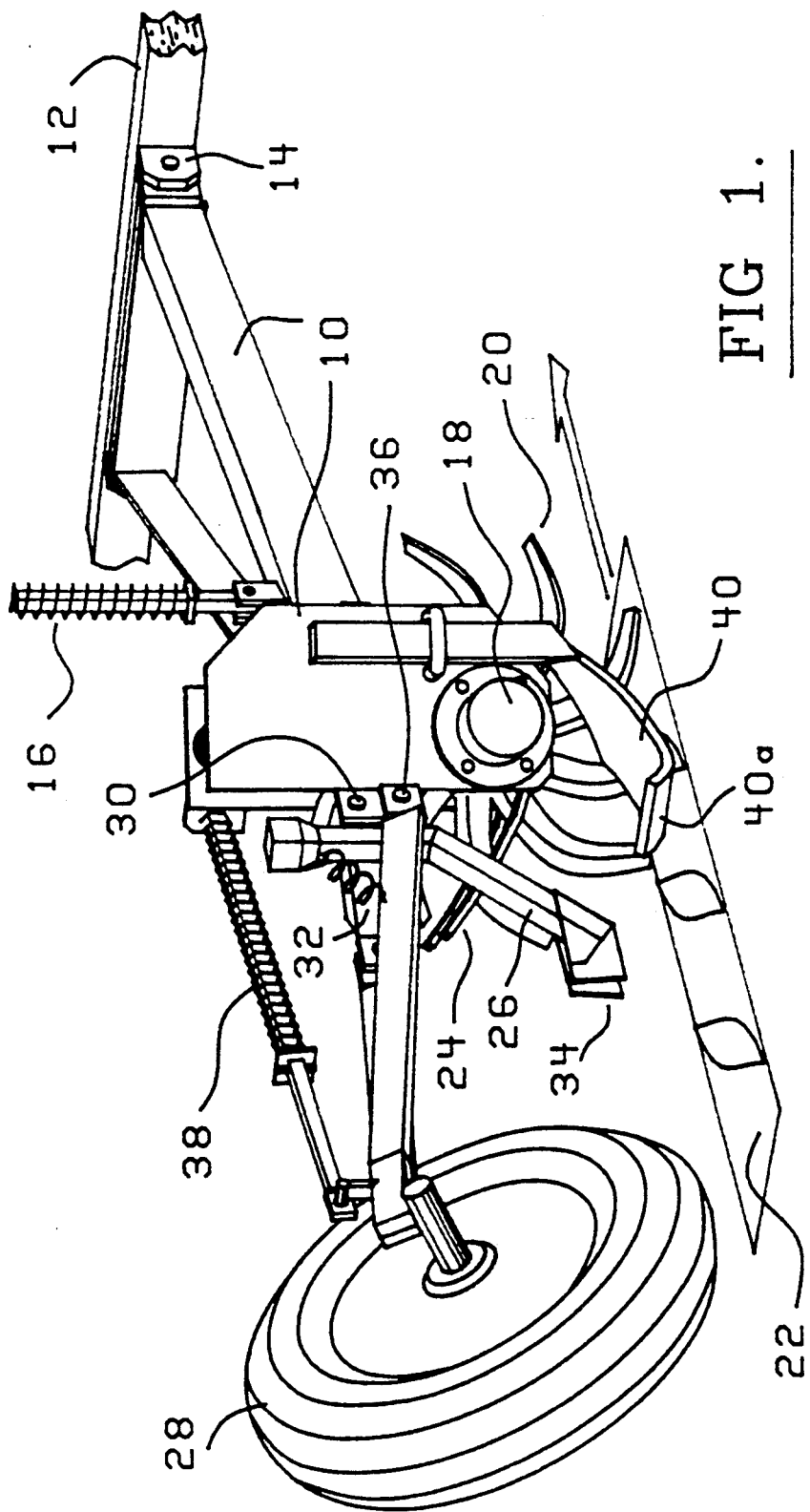
FIG. 1 is a side view from the right rear of a planter according to the invention.
Figure 2:
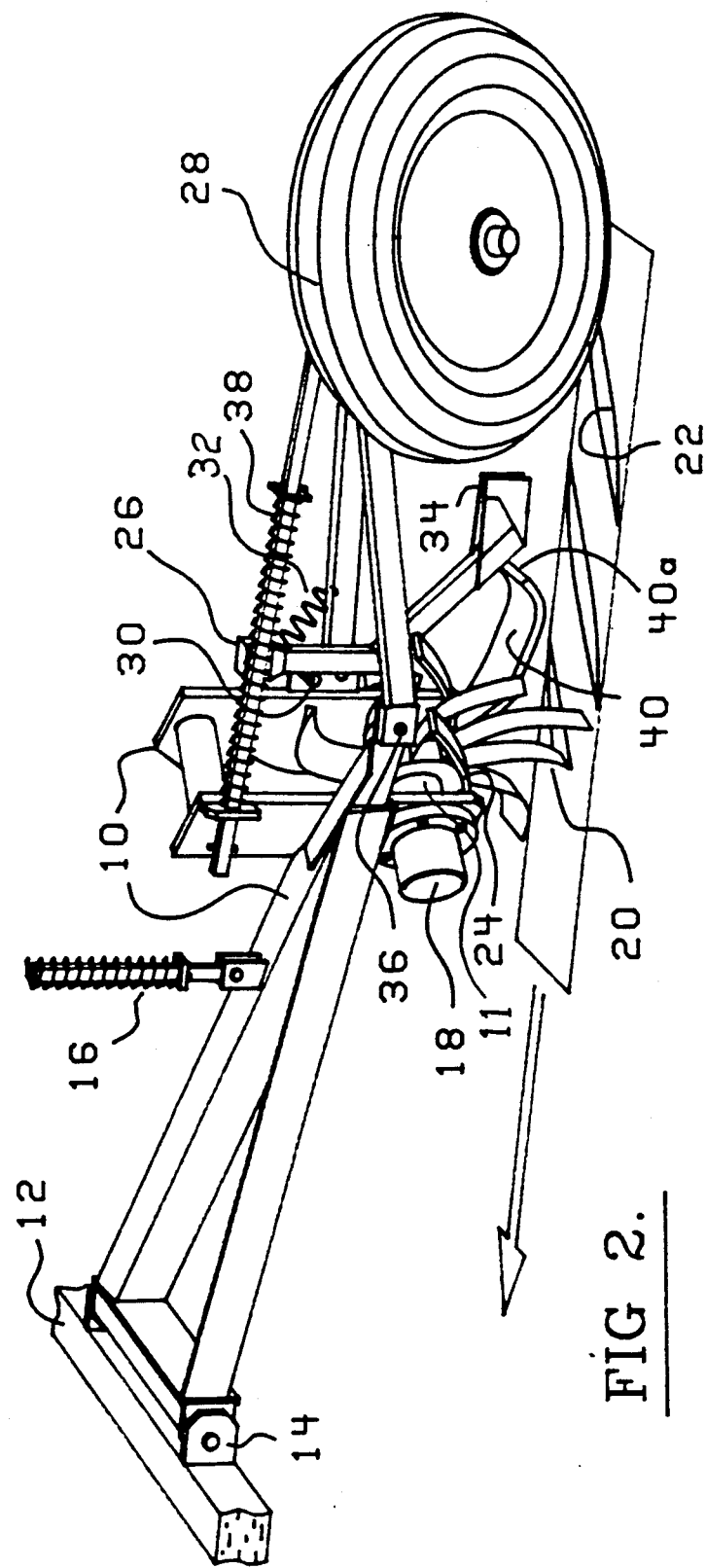
FIG. 2 is a view of the planter from the left rear.

Referring to the drawings generally, reference numeral 10 shows a frame which enables attachment of the implement to a conventional drawn tool bar 12, pivoted about transverse hinges 14. An adjustable spring 16 is provided which acts between the tool bar 12 and the frame 10 to provide down force for enhanced ground engagement. The spring 16 may optionally act in association with a lifting arm (not shown) when the planter is mounted to a trailed frame as opposed to a standard three point hitch.

The frame 10 carries a freely rotating shaft 11 which is journalled in bearings 18 and which furthermore carries, in this instance, one spider or rotary cultivator tine 20 which is ground engaging and, when, in motion, creates a series of diagonal slots in the narrow area 22 into which seed is deposited. Positioned adjacent to the spider 20 are fixed sweepers 24 which clear any trash accumulation from the spider 20 as it rotates.

The trailing seed chute 26 may be fed via a flexible tube (not shown) from any conventional seed dispensing mechanisim (also not shown) which would be mounted generally above the unit, seed being thereby deposited in the area 22 between the spider 20 and a seed covering wheel 28. The seed chute 26 is free to pivot about axis 30, but is restricted downwardly by the sweeper 24. The spring 32 applies a light downward force to the seed chute 26 to prevent the skirts 34 made of a deformably flexible material from bouncing whilst trailing along the surface of the cut soil. The flexible skirts 34 prevent adhesion of damp soil, while also enabling the seed chute 26 to ride over clumps of trash, yet remain in close proximity with the soil surface, thereby minimizing seed scattering upon impact of the seeds with the soil.

The seed covering press wheel 28 is a simple but effective device being trailed from the frame 10 about a hinge at axis 36. The wheel 28 is leaning away and also set with toe out from the direction of travel of the planter, so that soil, which tends to be wind-rowed by the spider 20 to the side of the treated area 22, is thrown back onto the seed falling down between skirts 34. Downward force may be applied by adjustable spring 38 to suit prevailing conditions.

There is provided a surface contacting device 40 to act like a sled which is vertically adjustable and which regulates the depth of ground cut effected by the spider 20. This component is easily and inexpensively replaced when worn from extended surface contact. It has been found that this angled "ski shaped" device 40 is extremely effective in use, riding easily over all surfaces and ensuring adequate accuracy of planting depth, even at speeds well above those normally encountered in the planting of seed. An up-turned portion 40a minimizes the chance of damaging the planter should it accidentally be allowed to run back when still in contact with the ground.

It is believed that the effectiveness of the planter herein described, together with its relative simplicity of design, combine in a manner which constitutes a significant advance in the present state of the art.

I claim:

1. A seed planter unit comprising:
   a frame having front and rear ends and defining a longitudinal axis of said planter which defines a travel direction therefore;
   means, adjacent the front end, for attaching said planter to planter conveying means;
   means for supporting said frame at a desired height above a surface of soil;
   a shaft mounted to the frame, oriented at an acute angle to and transversely of the longitudinal axis;
   soil groove cutting means, consisting of a plurality of circumferentially spaced individual groove forming tines extending away from the shaft and all lying substantially in a single plane normal to the shaft, supported by said shaft for free rotation about the axis of the shaft and positioned to interact with the soil, said acute angle being such that the tines of the soil groove cutting means will be rotated about said shaft axis by their interaction with the soil during forward motion of the planter in the direction of travel, all said groove forming tines being angled to extend, adjacent their ends, circumferentially in a direction opposite to the direction of said rotation of the soil groove cutting means to produce, during said forward motion of said planter in the direction of travel, a sequential plurality of discrete parallel open topped grooves in the surface of that soil, each said groove extending transversely of the direction of travel at an acute angle thereto; and
   means attached to the frame for supplying seed to said open topped plurality of grooves subsequent to their formation.

2. A seed planter according to claim 10, wherein said tines are circumferentially evenly spaced about the shaft axis thereby to form grooves evenly spaced apart.

3. A seed planter according to claim 2, wherein all said tines are identical.

4. A seed planter according to claim 1, further comprising groove covering means attached to said frame for placing soil in said grooves after supply of said seed thereto.

5. A seed planter according to claim 4, wherein said groove covering means is mounted adjacent the rear end of said frame and is resiliently biased into contact with said surface.

6. A seed planter according to claim 5, wherein said groove covering means is a wheel disposed to rotate about an axis extending transversely of said longitudinal axis at an acute angle thereto.

7. A seed planter according to claim 6, wherein the axis of the wheel is disposed at an acute angle to a direction normal to said surface whereby movement of the planter in the direction to travel will cause rotation of said wheel to place said soil in said grooves.

8. A seed planter according to claim 7, wherein said wheels periphery is defined by a pneumatic tire.

9. A seed planter according to claim 1, wherein said supporting means is adjustable to set the frame at a desired height above the soil surface.

10. A seed planter according to claim 9, wherein said support means has a soil contacting foot in the form of a skid plate.

11. A seed planter according to 1, comprising sweeper means mounted on said frame and positioned to intercept and remove debris carried by said soil groove cutting means.

12. A seed planter according to claim 11, wherein said sweeper means comprise at least one elongate member disposed on each of opposed sides of said soil groove cutting means and oriented to interact with said soil groove cutting means during rotation thereof to convey debris away from said soil groove cutting means.

13. A seed planter according to claim 1, wherein said means for attaching defines an axis parallel to said surface about which the said planter is free to pivot, said pivotable motion being the only motion permitted of the planter relative to the conveyor means.

14. A seed planter according to claim 1, wherein said seed supply means terminates in flexible guide means to guide seeds into said grooves.

15. A seed planter according to claim 14, wherein said seed supply means is pivotably mounted to said frame and is resiliently biased into contact with said surface.

16. A seed planter according to claim 1, wherein only a single soil groove cutting means is supported by said shaft.

* * * * *